United States Patent
Li et al.

(10) Patent No.: US 11,842,611 B2
(45) Date of Patent: Dec. 12, 2023

(54) UNMANNED STORE

(71) Applicant: IVIEW DISPLAYS (SHENZHEN) COMPANY LTD., Shenzhen (CN)

(72) Inventors: Xiang Li, Shenzhen (CN); Mingnei Ding, Shenzhen (CN); Steve Yeung, Hongkong (CN); Zhiqiang Gao, Hongkong (CN)

(73) Assignee: IVIEW DISPLAYS (SHENZHEN) COMPANY LTD., Shenzhen (CN)

( * ) Notice: Subject to any disclaimer, the term of this patent is extended or adjusted under 35 U.S.C. 154(b) by 0 days.

(21) Appl. No.: 17/739,272

(22) Filed: May 9, 2022

(65) Prior Publication Data

US 2023/0072228 A1    Mar. 9, 2023

(30) Foreign Application Priority Data

Sep. 9, 2021   (CN) .......................... 202122187809.8

(51) Int. Cl.
*G07G 1/01*        (2006.01)
*G03B 21/12*       (2006.01)
*G06Q 30/0601*     (2023.01)

(52) U.S. Cl.
CPC .............. *G07G 1/01* (2013.01); *G03B 21/12* (2013.01); *G06Q 30/0623* (2013.01); *G06Q 30/0643* (2013.01)

(58) Field of Classification Search
CPC .................................. G07G 1/01; G03B 21/12
USPC .................................................. 235/383, 375
See application file for complete search history.

(56) References Cited

U.S. PATENT DOCUMENTS

| | | | |
|---|---|---|---|
| 10,198,080 B1* | 2/2019 | Worley, III | G06F 3/017 |
| 2013/0173433 A1* | 7/2013 | Moghadam | G06Q 20/322 |
| | | | 705/27.2 |
| 2018/0166046 A1* | 6/2018 | Yamazaki | G06V 20/52 |
| 2021/0241590 A1* | 8/2021 | Iwai | G08B 13/19608 |

* cited by examiner

Primary Examiner — Suezu Ellis
(74) Attorney, Agent, or Firm — IPRO, PLLC

(57) ABSTRACT

An unmanned store is provided. The unmanned store includes a projection device, a rotation device, a functional keypad, and a control system. The projection device may project a virtual image to a real space of the unmanned store; the rotation device is connected to the projection device, and is configured to drive the projection device to rotate such that the virtual image moves in the real space; the functional keypad includes a functional key, and may send a key signal to a control system in response to the functional key being pressed; upon receiving the key signal, the control system switches the commodity information displayed by the projection device based on the key signal.

9 Claims, 3 Drawing Sheets

UNMANNED STORE

CROSS-REFERENCE TO RELATED APPLICATIONS

This application is a continuation of Chinese Patent Application No. 202122187809.8, filed with the Chinese Patent Office on Sep. 9, 2021, and entitled "AN UNMANNED STORE", the entire contents of which are incorporated herein by reference.

TECHNICAL FIELD

Embodiments of the present disclosure relate to the technical field of unmanned stores, and in particular, relate to an unmanned store.

Embodiments of the present disclosure relate to the technical field of unmanned stores, and in particular, relate to an unmanned store.

BACKGROUND

Conventional unmanned stores have smart and automatic business procedures by technical means, without or with extremely less human intervention, and thus create some convenience to shopping of users. However, most unmanned stores operate only based on simple smart processing devices and programs, and provide simple shopping instructions for the user. When the user needs to know details of a commodity in the store, the user fails to acquire related instructions in the conventional unmanned stores. This brings about a poor shopping experience to the user.

SUMMARY

The present disclosure provides an unmanned store. The unmanned store includes:

a projection device, configured to project a virtual image to a real space of the unmanned store;

a rotation device, connected to the projection device, and configured to drive the projection device to rotate such that the virtual image moves in the real space;

a functional keypad, including a functional key, and configured to send a key signal to a control system in response to the functional key being pressed;

a control system, communicably connected to the projection device, the rotation device, and the functional keypad, and configured to receive the key signal, and switch the virtual image of the projection device based on the key signal, the virtual image including commodity information.

In some embodiments, the functional keypad further includes a translation key, configured to switch a display language of the virtual image.

In some embodiments, the functional keypad further includes a trigger key, configured to trigger the control system to control the projection device to project the commodity information.

In some embodiments, the projection device further includes:

a first projection device, disposed outside the unmanned store, and configured to project a virtual image outside the unmanned store; and a second projection device, disposed inside the unmanned store, and configured to project a virtual image inside the unmanned store.

In some embodiments, the unmanned store further includes a voice device, wherein the voice device is configured to perform voice recognition and voice output.

In some embodiments, the unmanned store further includes at least one imaging device, wherein the imaging device is configured to capture an image.

In some embodiments, the unmanned store further includes a power supply device, wherein the power supply device is electrically connected to the projection device, the imaging device, the rotation device, the voice device, the functional keypad, and the control system.

In some embodiments, the unmanned store further includes a communication module, wherein the communication module is connected to the control system.

In some embodiments, the functional keypad is disposed on a commodity desk, wherein the commodity desk is configured to accommodate a commodity.

In some embodiments, the imaging device is mounted on a ceiling and/or on a wall of the unmanned store; or the rotation device is mounted on a ceiling and/or on a wall of the unmanned store, and the projection device is mounted on the rotation device.

Embodiments of the present disclosure achieve the following beneficial effects: As compared with the related art, the unmanned store provided in the embodiments of the present disclosure includes the functional keypad, wherein the functional keypad includes the functional key, and is configured to send a key signal to the control system in response to the functional key being pressed; upon receiving the key signal, the control system switches the commodity information displayed by the projection device based on the key signal. A user may perform man-machine interaction with the unmanned store and further know information of a commodity by pressing a functional key on the functional keypad, thereby improving shopping experience of the user.

BRIEF DESCRIPTION OF THE DRAWINGS

One or more embodiments are illustrated by way of example, and not by limitation, in the accompanying drawings, wherein components having the same reference numeral designations represent like components throughout. The drawings are not to scale, unless otherwise disclosed.

DETAILED DESCRIPTION

For better understanding of the present disclosure, the present disclosure is described in detail with reference to attached drawings and specific embodiments. It should be noted that, when an element is defined as "being secured or fixed to" another element, the element may be directly positioned on the element or one or more centered elements may be present therebetween. When an element is defined as "being connected or coupled to" another element, the element may be directly connected or coupled to the element or one or more centered elements may be present therebetween. As used herein, the terms "upper," "lower," "inner," "outer," "internal," "external," and the like expressions are used for illustration purposes only.

Unless the specification clearly requires otherwise, throughout the description and the claims, the technical and scientific terms are to be construed in an inclusive sense as opposed to an exclusive or exhaustive sense. Additionally, the terms used in the specification of the present disclosure are merely for description the embodiments of the present disclosure, but are not intended to limit the present disclosure. As used herein, the term "and/or" in reference to a list of one or more items covers all of the following interpretations of the term: any of the items in the list, all of the items in the list and any combination of the items in the list.

Figure 1:
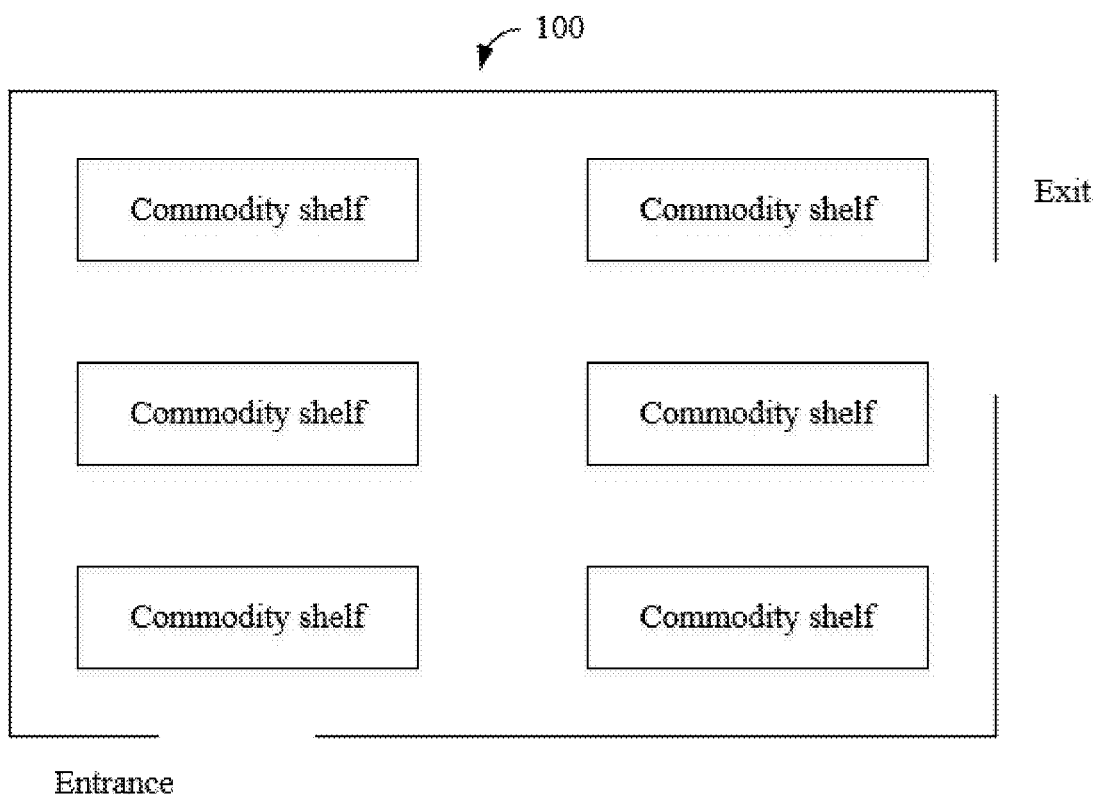
FIG. 1 is a schematic structural diagram of an unmanned store according to an embodiment of the present disclosure.

FIG. 1 illustrates an architectural structure of an unmanned store 100. The unmanned store is generally built in the form of a house or the like buildings in which an inner space and an outer space are formed. The inner space is for storing commodities, and the inner space has an entrance and an exit. Users may enter the store via the entrance to implement self-shopping.

Figure 2:
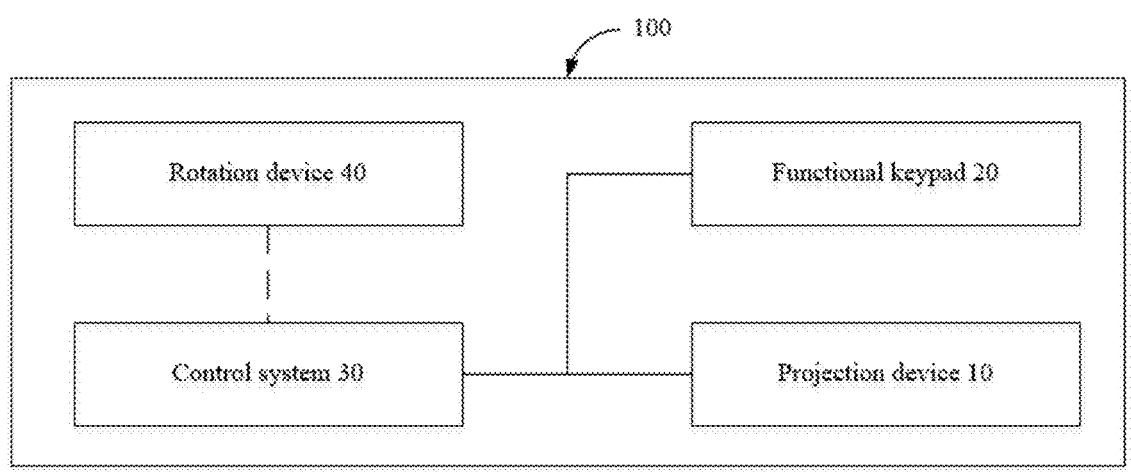
FIG. 2 is a schematic structural diagram of an electrical portion of the unmanned store according to an embodiment of the present disclosure.

An embodiment of the present disclosure provides an unmanned store. FIG. 2 is a schematic structural diagram of an electrical portion of an unmanned store 100. As illustrated in FIG. 2, the unmanned store 100 includes a projection device 10, a functional keypad 20, a control system 30, and a rotation device 40. The rotation device 40 is connected to the projection device 10, and the control system 30 is communicably connected to the projection device 10, the rotation device 40, and the functional keypad 20.

The projection device 10 is configured to project a projection screen onto a projection bearing surface for display. The projection bearing surface may be any suitable flat surface or curved surface, for example, a wall surface. The projection device 10 may be any projection device having a projection function, for example, a projector or the like; and may employ any suitable projection technology, for example, CRT, LCD, DLP, or DLV. The projection device generally includes a light source, a lens, and the like.

The projection device 10 may project various suitable virtual images in the unmanned store, for example, commodity information, commodity recommendation information, further description information of the commodity information, or the like.

In some embodiments, the projection device 10 may include a first projection device and a second projection device. The first projection device is disposed outside the unmanned store, and is configured to project a virtual image outside the unmanned store; and the second projection device is disposed inside the unmanned store, and is configured to project a virtual image inside the unmanned store. One or more first projection devices and one or more second projection devices are provided.

The functional keypad 20 includes a plurality of functional keys. In the case that a functional key is pressed, the functional keypad 20 generates a key signal. Upon receiving the key signal, the control system 30 identifies the functional key corresponding to the key signal, and controls the projection device 10 to project commodity information corresponding to the functional key.

In some other embodiments, the functional keypad 20 may further include a trigger key. In the case that the trigger key is pressed, the functional keypad 20 generates another key signal. Upon receiving the key signal, the control system 30 identifies the trigger key corresponding to the key signal, and controls the projection device 10 to project and display information of a commodity.

Figure 3:
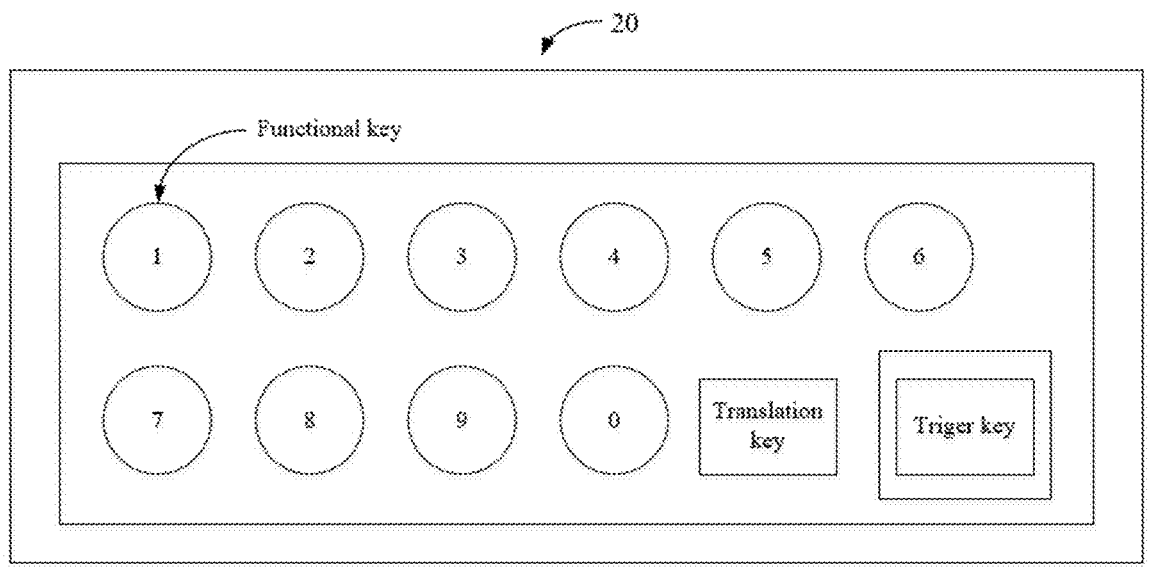
FIG. 3 is a schematic structural diagram of a functional keypad in the unmanned store according to an embodiment of the present disclosure.
Figure 4:
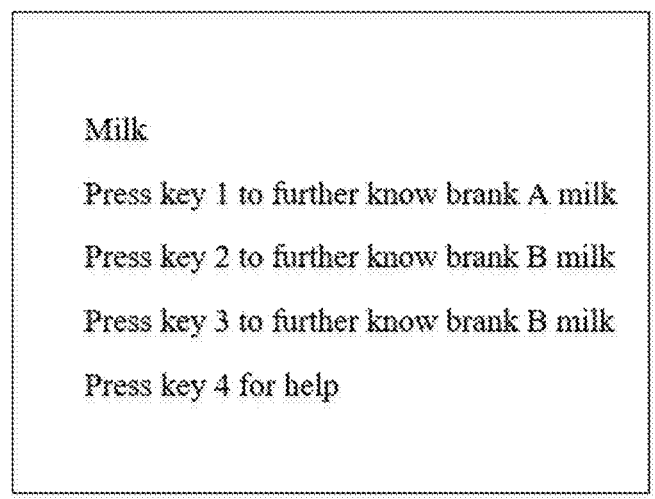
FIG. 4 is a schematic diagram of an application scenario of the functional keypad in the unmanned store according to an embodiment of the present disclosure.

An application scenario of the functional keypad 20 is illustrated using FIGS. 3 and 4 as examples. When the user reaches a commodity (such as milk), the user may press the trigger key on the functional keyboard 20; and the control system 30 receives the key signal corresponding to the trigger key, and controls the projection device 10 to display the commodity information of the milk, such as manufacturer, place of origin, composition, and calorie.

For brevity, more commodity information is not displayed. In order to meet the user's demand for knowing the commodity, the projection device 10 simultaneously displays the information as illustrated in FIG. 4. When the user presses a functional key 1 on the functional keyboard 20, the control system 30 receives the key signal corresponding to the functional key 1, and controls the projection device 10 to switch the virtual image to display the detailed commodity information of brand A milk. The above application scenario is only an exemplarily illustration but does not cause any limitation on the function of the functional keypad 20.

The functional keypad 20 may be any device similar to a keyboard or keypad, for example, a mechanical keypad, and may include a contact-type switch and a key circuit. In the case that the contact-type switch is pressed, a contact of the contact-type switch is conducted, the key circuit is conducted, and the key circuit generates a key signal.

The control system 30 is a control center of the unmanned store 100, and is configured to coordinate various parts of the unmanned store 100, thereby implementing functionality of the unmanned store 100. The control system 30 may be one controller, or may include a plurality of controllers. In a scenario of including a plurality of controllers, the control system 30 may be a combination of controllers disposed in the various parts (including the rotation device and the projection device).

The rotation device 40 is connected to the projection device 10 or indirectly connected to the projection device 10 via an auxiliary structure, and is configured to drive the projection device 10 to rotate, such that the virtual image projected by the projection device 10 rotates in a real space. The rotation device 40 may be any suitable device having a rotation function, for example, a pan-tilt platform, or the like. The rotation device 40 may adjust an angle of the projection device, for example, a pan angle or a tilt angle.

The rotation device 40 generally includes a body, and a drive mechanism, a transmission mechanism, a motor and the like that are disposed in the body. Where the rotation device 40 is employed to adjust the pan angle and the tilt angle of the projection device, the motor may include a pan motor and a tilt motor.

The drive mechanism may be communicably connected to the control system 30, and receive a control signal from the control system 30 and generate a drive signal based on the control signal. The motor may rotate under driving of the drive mechanism, such that the transmission mechanism is driven to rotate. As the transmission mechanism moves, the projection device may be driven to move, for example, to adjust the pan angle and the tilt angle of the projection device.

The unmanned store according to the embodiments of the present disclosure includes the functional keypad 20. Referring to FIG. 3, the functional keypad 20 includes the functional key, and is configured to send a key signal to the control system in response to the functional key being pressed; upon receiving the key signal, the control system switches the commodity information displayed by the projection device 10 based on the key signal. A user may perform man-machine interaction with the unmanned store and further know information of a commodity by pressing a functional key on the functional keypad 20, thereby improving shopping experience of the user.

In some other embodiments, the functional keypad 20 may further include a translation key. The translation key is configured to translate texts between Chinese and other foreign languages, such that the texts are projected in a language understandable by the user.

In practice, the functional keypad 20 may be disposed on a commodity desk accommodating a commodity, and placed on the same desk as the commodity, which is convenient for the user to perform key operations on the commodity.

Figure 5:
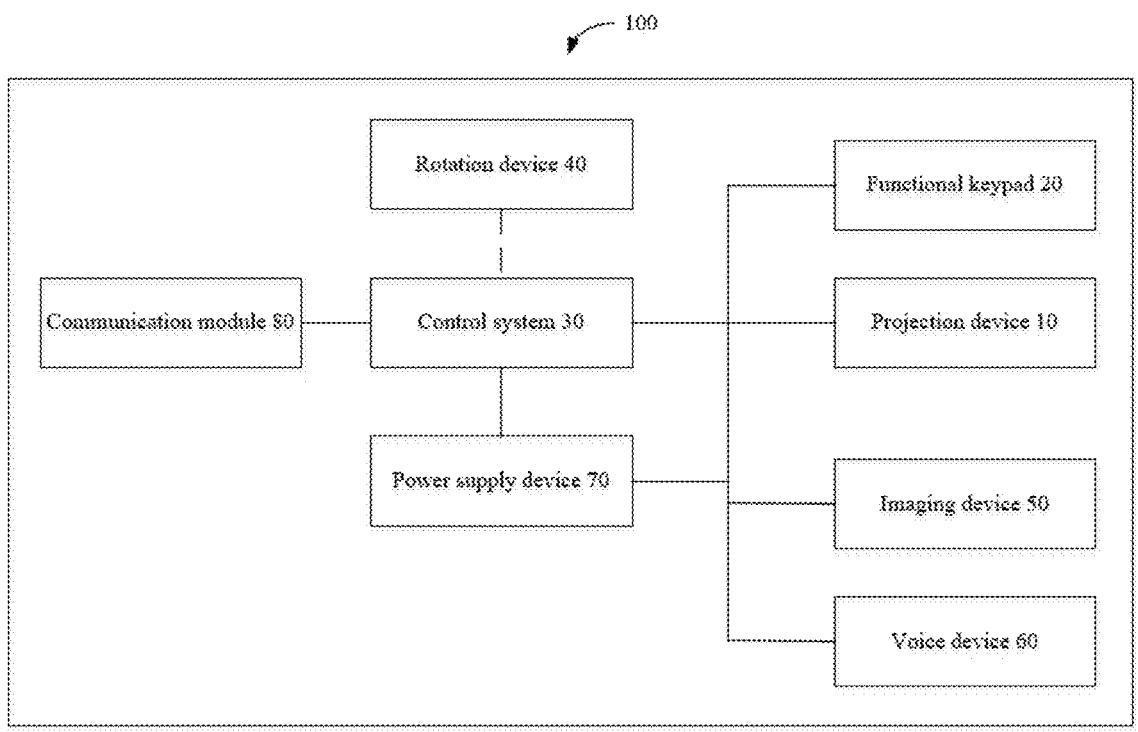
FIG. 5 is a schematic structural diagram of an electrical portion of the unmanned store according to another embodiment of the present disclosure.

The unmanned store may further include a voice device 60. Referring to FIG. 5, the voice device 60 is communicably connected to the control system 30. The voice device 60 may include a voice output unit and a voice recognition unit, and be configured to perform voice recognition and voice output. Specifically, the voice device 60 may include a speaker, a microphone, a voice recognition chip, and the like.

In some other embodiments, referring to FIG. 5, the unmanned store may further include an imaging device 50. The imaging device 50 is configured to capture an image, and transmit the image to the control system 30, such that the control system 30 performs image recognition based on the received image, for example, identity recognition (including face recognition), commodity recognition, position recognition, or the like. The imaging device 50 may be any suitable device having an image capture function, for example, a camera, a monitor, or the like. In some embodiments, the imaging device 50 may be mounted on a ceiling and/or on a wall of an inner space of the unmanned store.

In some embodiments, referring to FIG. 5, the unmanned store may further include a power supply device 70. The power supply device 70 is electrically connected to the projection device 10, the imaging device 50, the rotation device 40, the voice device 60, the functional keypad 20, and the control system 30, to supply power to these devices. It may be understood that the power supply device may be an alkaline battery or a lithium battery.

In some embodiments, referring to FIG. 5, the unmanned store may further include a communication module 80, wherein the communication module 80 is connected to the control system 30. The communication module is configured to wiredly or wirelessly communicate with other devices. It may be understood that the communication module may be a Bluetooth module, a Wi-Fi module, or the like.

The unmanned store 100 includes a projection device 10, a functional keypad 20, a rotation device 40, an imaging device 50, a voice device 60, a commodity desk, a commodity, an entrance, an exit, and a door.

The imaging device 50 and the rotation device 40 are both mounted on a position close to a ceiling on a wall of the unmanned store, and the projection device 10 is mounted on the rotation device 40. The functional keypad 20 is disposed on a commodity desk.

It may be understood that the placement of the projection device 10 is not limited, as long as the projection device is capable of normally projecting a projection screen in the unmanned store 20. It may be understood that the placement of the imaging device 50 is not limited, as long as the imaging device is capable of normally capturing image information in the unmanned store. The application scenario in FIG. 1 is only an exemplarily illustration but does not cause any limitation on the application of the unmanned store.

It should be noted that the specification and drawings of the present disclosure illustrate preferred embodiments of the present disclosure. However, the present disclosure may be implemented in different manners, and is not limited to the embodiments described in the specification. The embodiments described are not intended to limit the present disclosure, but are directed to rendering a thorough and comprehensive understanding of the disclosure of the present disclosure. In addition, the above described technical features may incorporate and combine with each other to derive various embodiments not illustrated in the above specification, and such derived embodiments shall all be deemed as falling within the scope of the disclosure contained in the specification of the present disclosure. Further, a person skilled in the art may make improvements or variations according to the above description, and such improvements or variations shall all fall within the protection scope as defined by the claims of the present disclosure.

What is claimed is:

1. An unmanned store, comprising:
   a projection device, configured to project a virtual image to a real space of the unmanned store;
   a rotation device, connected to the projection device, and configured to drive the projection device to rotate such that the virtual image moves in the real space;
   a functional keypad, comprising a functional key, and configured to send a key signal to a control system in response to the functional key being pressed;
   a control system, communicably connected to the projection device, the rotation device, and the functional keypad, and configured to receive the key signal, and switch the virtual image of the projection device based on the key signal, the virtual image comprising commodity information.

2. The unmanned store according to claim 1, wherein the functional keypad further comprises a translation key, configured to switch a display language of the virtual image.

3. The unmanned store according to claim 2, wherein the functional keypad further comprises a trigger key, configured to trigger the control system to control the projection device to project the commodity information.

4. The unmanned store according to claim 1, wherein the projection device comprises:
   a first projection device, disposed outside the unmanned store, and configured to project a virtual image outside the unmanned store; and
   a second projection device, disposed inside the unmanned store, and configured to project a virtual image inside the unmanned store.

5. The unmanned store according to claim 1, further comprising: a voice device, wherein the voice device is communicably connected to the control system, and is configured to perform voice recognition and voice output.

6. The unmanned store according to claim 1, further comprising: at least one imaging device, wherein the imaging device is communicably connected to the control system, and is configured to capture an image.

7. The unmanned store according to claim 6, wherein the imaging device is mounted on a ceiling and/or on a wall of the unmanned store; or
   the rotation device is mounted on a ceiling and/or on a wall of the unmanned store, and the projection device is mounted on the rotation device.

8. The unmanned store according to claim 1, further comprising:
a voice device;
at least one imaging device;
a power supply device, wherein the power supply device is electrically connected to the projection device, the imaging device, the rotation device, the voice device, the functional keypad, and the control system.

9. The unmanned store according to claim 1, further comprising: a communication module, wherein the communication module is connected to the control system.

* * * * *